United States Patent [19]

Bennett

[11] Patent Number: 5,588,125
[45] Date of Patent: Dec. 24, 1996

[54] METHOD AND APPARATUS FOR INCREASING BUS BANDWIDTH ON A SYSTEM BUS BY INHIBITING INTERRUPTS WHILE POSTED I/O WRITE OPERATIONS ARE PENDING

[75] Inventor: Brian R. Bennett, Laguna Niguel, Calif.

[73] Assignee: AST Research, Inc., Irvine, Calif.

[21] Appl. No.: 410,560

[22] Filed: Mar. 24, 1995

Related U.S. Application Data

[63] Continuation of Ser. No. 139,468, Oct. 20, 1993, abandoned.

[51] Int. Cl.⁶ .............................. G06F 13/38; G06F 9/46
[52] U.S. Cl. .......................... 395/306; 395/309; 395/735; 395/869
[58] Field of Search ................................ 395/306, 308, 395/309, 310, 734, 735, 736, 739, 868, 869, 872, 877

[56] References Cited

U.S. PATENT DOCUMENTS

| | | | |
|---|---|---|---|
| 4,159,516 | 6/1979 | Henrion et al. | 395/869 |
| 4,626,987 | 12/1986 | Renninger | 395/725 |
| 4,953,072 | 8/1990 | Williams | 395/725 |
| 5,003,463 | 3/1991 | Coyle et al. | 395/275 |
| 5,239,636 | 8/1993 | Dujari et al. | 395/872 |
| 5,265,255 | 11/1993 | Bonvento et al. | 395/725 |
| 5,269,005 | 12/1993 | Heil et al. | 395/275 |
| 5,283,904 | 2/1994 | Carson et al. | 395/725 |
| 5,295,246 | 3/1994 | Bischoff et al. | 395/250 |
| 5,367,689 | 11/1994 | Mayer et al. | 395/868 X |

OTHER PUBLICATIONS

"Software for the HP EISA SCSI Card" H–P Jr'l, Dec. 1992, Thomas et al.

*Primary Examiner*—Glenn A. Auve
*Attorney, Agent, or Firm*—Knobbe, Martens, Olson & Bear

[57] ABSTRACT

A system for inhibiting interrupts during posted write transfers in a computer system utilizes a buffer to store incoming data and addresses while monitoring incoming addresses to determine if the address is an Input/Output reference to an interrupt controller. If an Input/Output reference to an interrupt controller is detected, a counter is incremented which outputs a logical zero output. A signal indicating a counter value of zero is provided as an input to an AND gate. A second input to the AND gate is provided from an interrupt controller. When the counter contains a non-zero value, a zero input is provided to the AND gate and a zero output is provided to the system bus, regardless of the output from the interrupt controller, inhibiting all further interrupts. Thus, when an interrupt mask is set by a CPU, the present invention immediately inhibits further interrupts from occurring, thereby permitting processing to continue without interruption. As a result, processing time is increased.

14 Claims, 3 Drawing Sheets

METHOD AND APPARATUS FOR INCREASING BUS BANDWIDTH ON A SYSTEM BUS BY INHIBITING INTERRUPTS WHILE POSTED I/O WRITE OPERATIONS ARE PENDING

This application is a continuation of application Ser. No. 08/139,468, filed Oct. 20, 1993, now abandoned.

BACKGROUND OF THE INVENTION

1. Field of the Invention

The present invention relates generally to increasing bus bandwidth in a computer system bus through posting input/output writes. Specifically, the present invention involves an apparatus and method of inhibiting interrupts during posted write transfers in a computer system.

2. Description of the Related Art

Many of the operations performed by a central processing unit ("CPU") are memory accesses on the system and input/output ("I/O") busses. Memory devices on the system bus respond quickly, allowing the CPU to operate at or near its maximum sustainable speed. I/O devices typically exhibit slower response times because they are usually accessed through a separate bus which is sometimes slower than the system bus and which utilizes a bus interface between the I/O bus and the system bus. In general, the CPU cannot terminate an I/O write cycle until the data has reached the intended destination and the system bus receives acknowledgment of this. The delay caused by I/O write operations is compounded in a multi-processor system because the bus interface or "bridge" may be placed between the System and I/O busses to arbitrate multiple processor transactions with devices on the I/O bus.

One conventional technique to allow a CPU to continue processing without waiting for the data for an I/O write cycle to reach its final destination is to "post" I/O write operations in the interface between the system bus and the I/O bus. (This interface is often called a bus bridge.) This simply means that the I/O bus bridge responds to the I/O write from the CPU immediately and "posts" the data in a buffer in the bus bridge. The data then propagates through the buffer and is delivered to the intended destination on the I/O bus. Posting permits the CPU write cycle to terminate on the system bus without waiting for the cycle to complete on the I/O bus.

In certain circumstances, conventional posted write techniques alleviate the I/O write delay; however, posting all write operations can lead to erroneous operation. For instance, when the CPU writes a control word (or mask) to the interrupt controller on the I/O bus to disable a specific interrupt or interrupts, the CPU no longer expects to receive the masked interrupt or interrupts. If the interrupt mask write operation is "posted" in the I/O bus bridge, the processor proceeds under the assumption that the masked interrupts will be inhibited. However, since the write cycle has not completed on the I/O bus (it is merely posted on the bus bridge), the interrupt controller has not received the mask. Thus, the interrupt controller may issue an unexpected interrupt and erroneous operations may result.

Conventionally, one of two approaches have been used to solve the potential inappropriate interrupt problem. The first approach is to refrain from posting those writes which can affect interrupts. During this time, all transactions on the system bus are delayed until the write affecting interrupts is completed. This approach is undesirable because it causes significant delay on the system bus until the I/O bus completes the write cycle.

The second approach involves the use of split transaction buses. This solution imposes a wait only on the processor originating the transaction, while freeing the multiprocessor ("MP") bus for use by other processors. The originating CPU waits until the bus bridge "reconnects" to the originating CPU and sends a signal indicating completion of the write cycle. Even though the system bus is released to permit other transactions to occur, the originating CPU still waits for the write cycle to complete. Although this approach is the less disruptive than holding the entire system bus in a wait state, a split transaction bus still requires the originating processor to wait until the write cycle completes.

SUMMARY OF THE INVENTION

The present invention provides an apparatus and method for increasing the bandwidth in a computer system and involves inhibiting interrupts during posted write transfers. This is accomplished without suspending the originating processor's operation during the write cycle's completion.

One aspect of the present invention is a method of increasing the bus bandwidth on a computer system bus coupled to an input/output (I/O) bus via a bus bridge. The method comprises the steps of temporarily posting write operations directed to the I/O bus in the bus bridge; inhibiting interrupts from propagating from the I/O bus to the system bus while the write operation is posted in the bus bridge; and allowing the interrupts to propagate from the I/O bus to the system bus when the write operation is transferred from the bus bridge to the I/O bus. Preferably, the method also comprises the step of acknowledging via the bus bridge that the write operation is complete when the write operation is initially posted, such that the system bus is free to handle further operations upon receipt of the signal. Also preferably, the step of inhibiting interrupts comprises inhibiting interrupts from propagating from the I/O bus when the write operation is directed to I/O address space, which, in a particularly preferred embodiment, is a write operation directed to the interrupt controller for the I/O bus. In the preferred method according to this aspect of the invention, the step of inhibiting interrupts comprises the steps of monitoring addresses from the system bus corresponding to the write operations to detect when the addresses are I/O addresses; and, when the address is an I/O address, inhibiting interrupts from the I/O bus from propagating to the system bus. Alternatively, the interrupts are inhibited only when the addresses are I/O addresses affecting interrupts.

Another aspect of the present invention is a system for increasing the bus bandwidth on a system bus which is coupled via a bus bridge to an input/output (I/O) bus. The system includes posted write circuitry on the bus bridge. The posted write circuitry is adapted to accept write operations from the system bus directed to devices on the I/O bus and is also adapted to acknowledge the write operation to the system bus such that the system bus becomes free to continue with further operations. The system also includes address detection logic on the bus bridge which monitors addresses associated with the write operations to determine if the addresses are for write operations which affect interrupts. The system further includes interrupt inhibit control circuitry responsive to the detection logic which, when an address is detected a for a write operation which affects interrupts, inhibits interrupts on the I/O bus from propagating to the system bus. Preferably, the system further includes posted write detection logic coupled to the posted write circuitry. The posted write detection logic monitors the number of write operations posted to the bus bridge to determine if the posted write circuitry is full. Write circuitry full logic is responsive to the write detection logic to disable the bus bridge from accepting write operations if the posted write circuitry is full.

A still further aspect of the present invention is a method of increasing bus bandwidth for a system bus in a computer wherein the system bus is coupled to an input/output (I/O) bus via a bus bridge. In such a system, the bus bridge posts at least one write operation from the system bus directed to devices on the I/O bus such that the system bus is free to continue operations after the write operation is posted on the bus bridge. The method according to this aspect of the invention comprises the steps of electronically monitoring an address on the system bus associated with the write operation to detect if the address is an I/O address for an interrupt controller for the I/O bus. The method signals a control logic circuit if the detected address is an I/O address for the interrupt controller, and, in response, interrupts are inhibited on the I/O bus from propagating to the system bus. The method includes the further steps of transferring the write operation to the I/O bus, and enabling interrupts on the I/O bus to propagate to the system bus after the write operation has been transferred. Preferably, the bus bridge can post more than one write operation from the system bus, and the method further comprises the steps of incrementing a counter on the bus bridge when each write operation is directed to the interrupt controller; detecting when write operations posted to the bus bridge and directed to the interrupt controller are transferred to the I/O bus; decrementing the counter when each write operation directed to the interrupt controller is transferred to the I/O bus; and inhibiting interrupts whenever the counter is non-zero.

Another aspect of the present invention is a method for inhibiting interrupts in a computer. The method includes monitoring addresses on a system bus for Input/Output references to an interrupt controller and inhibiting further interrupts from being signalled during a posted write to an interrupt controller. The method comprises the steps of writing data from the system bus to a first buffer; writing the address for Input/Output references from the system bus to a second buffer; monitoring the addresses by means of a first address decoder to determine the presence of the I/O reference to an interrupt controller; signaling the Input/Output reference to a control logic circuit which monitors the status of the first and second buffers to enable or disable the posting of writes to an input/output bus; incrementing a counter upon identification of the Input/Output reference to an interrupt controller and deasserting a signal provided as a first input to an AND gate; providing the output of the interrupt controller as a second input to the AND gate; and providing the output of the AND gate to the system bus. Preferably, this method further includes the steps of: monitoring the output of the buffers by a second address decoder substantially identical to the first address decoder to determine the presence of the Input/Output reference to an interrupt controller; providing the Input/Output reference to the counter; decrementing the count of the counter; and reasserting the signal from the counter to the AND gate, thereby enabling the interrupt. In particularly preferred embodiments of this method, the duration of time for which interrupts have been disabled is monitored to prevent a condition whereby the system may never receive an interrupt.

Another aspect of the present invention is a method of inhibiting interrupts in a computer by monitoring addresses on a system bus for Input/Output references to an interrupt controller. A counter value is incremented for each such reference. The counter value is decremented at the completion of each such reference. Further interrupts are inhibited while the counter value is non-zero.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
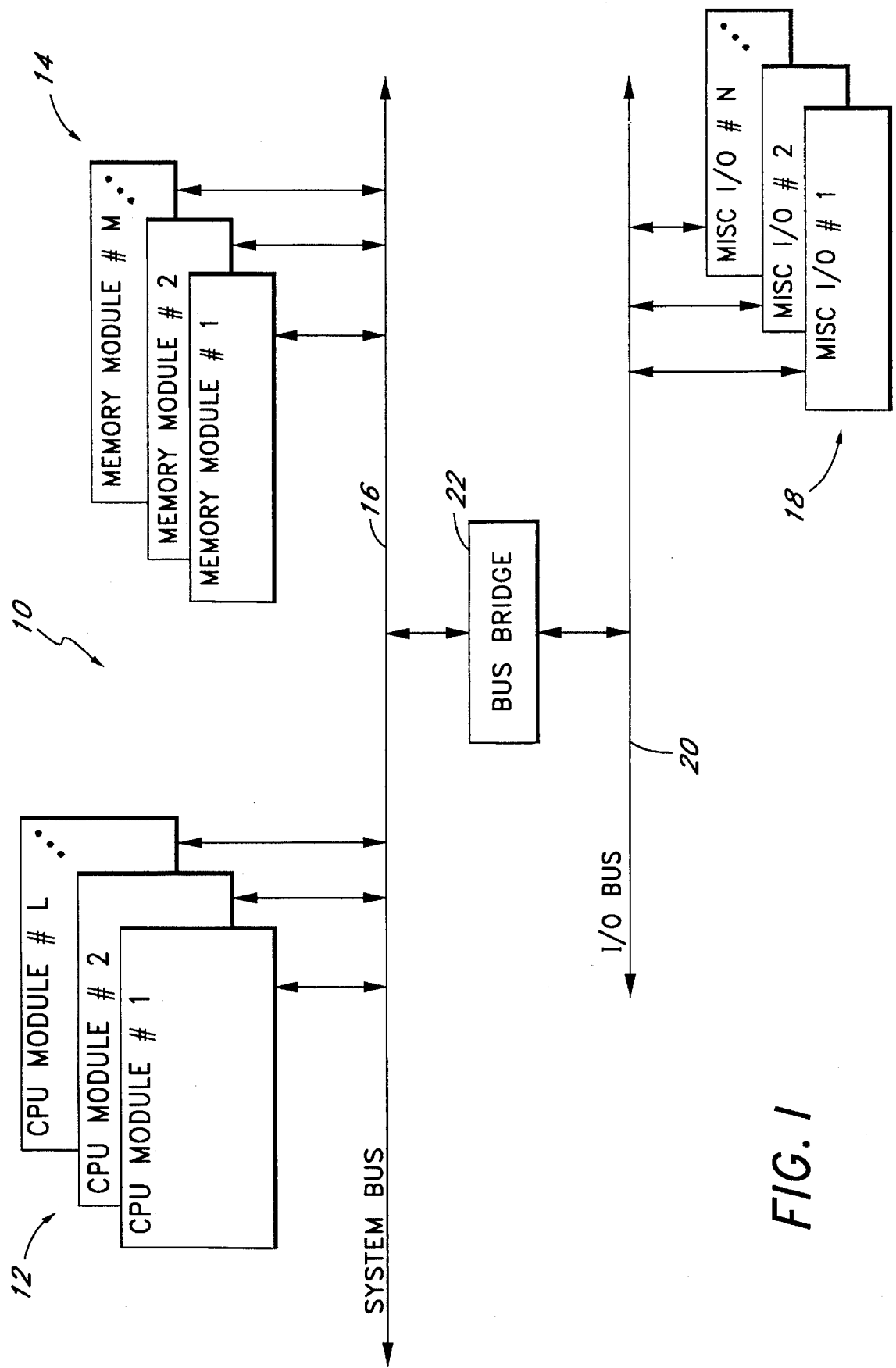
FIG. 1 is a system block diagram of an exemplary multi-processor system in which the bus architecture of the present invention is used.

The present invention is an improved bus architecture system for use in a computer system having a system bus coupled to an I/O bus via a bus bridge. The present embodiment is described in reference to a common bus, multiprocessor system with shared memory and resources. FIG. 1 illustrates a conventional multi-processor system 10 which contains a number of CPU modules 12 (e.g., CPU MODULE #1, CPU MODULE #2, . . . CPU MODULE #L) and a shared memory storage area containing a number of memory modules 14 (i.e., MEMORY MODULE #1, MEMORY MODULE #2, . . . MEMORY MODULE #M). The CPU modules 12 and memory modules 14 are coupled to a system bus 16. The multi-processor system 10 may also include various I/O and peripheral modules (i.e., MISC I/O #1, MISC I/O #2 . . . MISC I/O #N) 18, which are coupled along an I/O bus 20. It should be understood, however, that further devices may be installed on the system bus 16 and on the I/O bus 20, as well-known in the art. Preferably, an Extended Industry Standard Architecture ("EISA") or an Industry Standard Architecture ("ISA") I/O bus may be used. A bus bridge 22 provides an interface between the system bus 16 and the I/O bus 20 to arbitrate the data flow between the peripheral devices 18 and the system bus 16.

Bus Bridge

Figure 2:
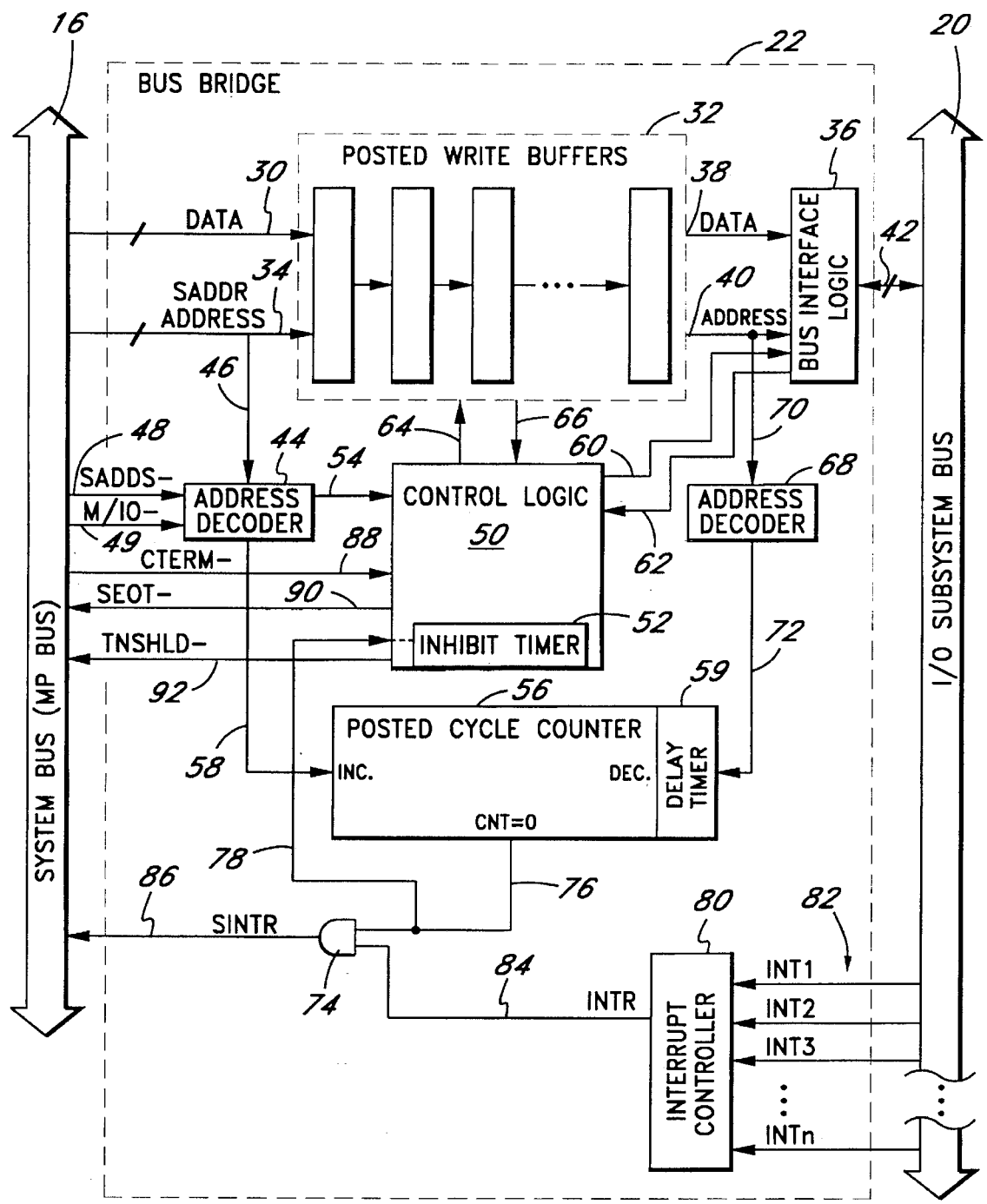
FIG. 2 is a block diagram illustrating the apparatus of the present invention in the bus bridge of the multiprocessor system in FIG. 1.

FIG. 2 is a more detailed block diagram illustrating the architecture of the bus bridge 22 used in the multiprocessor system 10 of FIG. 1. The bus bridge 22 includes the apparatus of the present invention. The bus bridge 22 includes posted write buffers ("buffers") 32 which receive inputs from the system bus 16 via a set of data lines 30 and a set of address lines 34. The buffers 32 are also connected to a conventional bus interface logic circuit 36 via a set of data lines 38 and a set of address lines 40. The bus interface logic circuit 36 communicates with the I/O subsystem bus via a set of signal lines 42.

A first address decoder 44 is coupled to the system via signal lines 34 and 46. A system bus address strobe (SADDS-) signal line 48 provides signals from the system bus 16 to the address decoder 44. A memory/IO- ("M/IO-") signal line 49 is also coupled from the system bus 16 to the first address decoder 44. The first address decoder 44 communicates with a control logic circuit 50, which has an inhibit timer 52, via a line 54. The address decoder 44 also communicates with a posted cycle counter ("counter") 56 via a signal line 58. The counter 56 is conventional and has a delay timer 59. The control logic circuit 50 communicates bi-directionally with the bus interface logic circuit 42 via a signal line 60 and a signal line 62. It also communicates bi-directionally with the buffers 32 via a signal line 64 and a signal line 66.

A second address decoder 68 is coupled to the buffers 32 via a signal line 40 and a signal line 70, and also communicates with the counter 56 via a signal line 72. In addition to the inputs received via the signal lines 58 and 72 from the first and second address decoders 44 and 68, the counter 56 has an output connected as one input of an AND gate 74 via a signal line 76. The counter 56 also communicates with the inhibit timer 52 via a CNT=0 signal on a signal line 78.

An interrupt controller 80 receives signals from the I/O subsystem bus 20 via several interrupt lines (INT1, INT2, INT3, . . . INTn) 82. For discussion purposes, these interrupt lines 82 are referred to as INTx 82. The interrupt controller 80 outputs an interrupt signal ("INTR") via a signal line 84, which is connected as a second input of the AND gate 74. The output of the AND gate 74 provides a system interrupt ("SINTR") signal line 86 to the system bus 16. The system interrupt line is understood by those skilled in the art.

In addition to the signal lines discussed above, a number of conventional control signal lines are coupled from the system bus 16 to the bus bridge 22, as well-known in the art. For purposes of this description, only signals pertinent to the present invention are discussed: A cycle terminate (CTERM-) signal on a signal line 88 is provided from the system bus 16 to the control logic 50; a system end of transaction (SEOT-) signal is provided on a signal line 90 which the control logic 50 provides to the system bus 16; and a transaction hold (TRNSHLD-) signal is provided on a signal line 92 from the control logic 50 to the system bus 16.

System Operation

As explained above, conventional techniques designed to permit a CPU on the system bus to continue processing without waiting for a slower device to respond are impractical in some instances. The present invention provides an apparatus and method of inhibiting interrupts during posted write transfers without requiring the originating processor to suspend operations.

In general, the present invention operates in conjunction with posted write operations where write operations on the system bus are posted on the bus bridge 22 en route to the I/O subsystem bus 20. As explained above, when a write is posted to the bus bridge 22, the bus bridge 22 provides a response on the system bus 16 to indicate that the write has been accepted. The microprocessor issuing the write request, and all other microprocessors, may utilize the system bus, even though the posted write has not reached its final destination on the I/O subsystem bus 20.

In order to account for the problem that can occur if write operations posted in the bus bridge affect the interrupts for the system, the present invention provides for a method and apparatus to examine each write operation and to disable all interrupts until write operations that may affect interrupts reach their final destinations on the I/O subsystem bus 20. The bus bridge still signals to the system bus 16 that the write cycle is complete, even though the data has not reached the intended destination. By inhibiting interrupts, the microprocessor executing a write operation to mask certain interrupts will not erroneously receive the masked interrupts.

The operation of the invention will now be described in additional detail. When a master device on the system bus 16 issues a write request directed to a device on the I/O subsystem bus 20, incoming addresses on the signal lines 34 are monitored by the address decoder 44. The address decoder 44 responds to the received addresses to determine if the address is a write to the interrupt controller 80. In the present embodiment, the address decoder 44 simply determines whether or not the write operation is to I/O space because the interrupt controller masks are memory mapped to I/O space. However, the decoder 44 could also only decode those addresses for the interrupt mask.

In the present embodiment, where the address decoder 44 simply determines whether the write is to I/O space, the decoder responds to a signal on the memory/IO (M/IO-) signal line 49 which signals that an I/O address is present on the system bus 16. If an I/O address is detected, the decoder activates its outputs on the signal line 54 and 58. The active signal on the signal line 58 increments the posted write cycle counter 56 by one. Whenever the counter 56 has a count greater than zero, the CNT=0 signal is asserted low (i.e., a logic low level output is provided on the signal line 76). The low level signal on the signal line 76 causes a low output on the SINTR signal line 86 output from the AND gate 74. As well-known in the art, when the SINTR signal line 86 is held low, further interrupts to the system are inhibited. Thus, whenever an I/O write is detected by the address decoder 44, the posted cycle counter becomes non-zero and immediately inhibits propagation of interrupts to the system bus. The CPU continues processing without the necessity of waiting until the write operation which might affect interrupts is written to the intended destination.

Once a write operation is posted on the bus bridge 22, the write operation is managed by the bus bridge, which relays the write to the I/O subsystem bus 20.

The second address decoder 68, which is coupled to the address signal lines 40 at the output of the posted write buffers 32, is also responsive to the address on the address lines 40 and detects when the address is an I/O address. In the present embodiment, whenever the second address decoder 68 detects that the write request exiting the posted write buffers 32 is an I/O write, it activates the signal line 72 which causes the posted cycle counter 56 to decrement. Accordingly, when the write operation which caused the increment to the counter 56 propagates through the buffers 32 to the I/O subsystem bus 20, the second address decoder circuit 68 decrements the counter 56. If the posted cycle counter 56 contains a count of "1" when a write to I/O space exits the posted write buffers 32, the decrement in the posted cycle counter 56 causes the posted cycle counter to decrement to zero. After a small delay implemented via the delay timer 59, the CNT=0 signal is asserted high. This delay is introduced to allow sufficient time for the data from the write operation to reach its destination. The delay assures that a write operation that contains a mask for the interrupt controller 80 has propagated to the interrupt controller 80. This delay may be implemented by a timer, as is well-known in the art. When the CNT=0 signal is asserted high, the logic level high signal on the signal line 76, which provides an input to the AND gate 74, will allow interrupts to propagate through the AND gate 74 to the SINTR signal line 86 coupled to the system bus 16. If one of the I/O write operations affects interrupts, the effect on interrupts will reach the interrupt controller 80 before interrupts are again allowed to propagate to the system bus.

As depicted in FIG. 2, the buffers 32 are temporary storage for data and addresses written to devices on the I/O subsystem bus 20. This temporary storage allows CPUs to complete write operations, even though the I/O Subsystem bus 20 may not be ready to receive new data. When the buffers 32 are enabled by the control logic 50 via the signal line 64, the data and address from the write operation are transferred from the system bus 16 via the data lines 30 and the address lines 34 and stored in the buffers 32. The data and addresses propagate through the buffers 32, using a First-In, First-Out ("FIFO") basis, to the bus interface logic 36 via lines 38 and 40. The bus interface logic 36 manages control signals, addresses and data as necessary for the bus bridge 22 to communicate with the I/O Bus 20.

In addition to the signal provided by the first address decoder 44 on the signal line 58 to the posted cycle counter 56, the address decoder 44 also indicates to the control logic 50 via the signal line 54 when any write directed to the I/O subsystem bus 20 has been detected. In response, the control logic 50 enables the posted write buffers 32 via the signal line 64 such that the data and address from the system bus 16 are transferred to the posted write buffers 32. The control logic 50 then acknowledges to the system bus 16 that the write has been accepted. Other cycles are allowed to run on the system bus 16. Even the CPU which issued the I/O write cycle is free to proceed with execution. As explained above, at the same time, the address decoder 44 increments the counter 56. As seen in FIG. 2, the posted write buffers 32 can be more than one deep (i.e., posting may be allowed for several cycles). Therefore, the posted cycle counter 56 has a maximum count which is equal to or greater than the number of posted writes which can be stored by the buffers 32. A non-zero count in the counter 56 deasserts the CNT=0 signal (i.e., changes it to a logical zero) on the signal line 78. Since the CNT=0 signal provided on line 76 and the INTR signal provided on line 84 are both inputs to the same AND gate 74, a logical zero drives the AND gate 74 output to zero, inhibiting the SINTR signal provided on signal line 86. As a result, when an interrupt mask (or in the present embodiment, any I/O write application) is written to the I/O bus 20 by a CPU on the system bus 16, the system of the present invention immediately prevents interrupts until all I/O writes posted in the bus bridge propagate to the I/O bus 20.

Because the system bus 16 can service more than one processor, a large number of data and addresses may be communicated to the buffers 32 from the system bus 16. If the buffers 32 become full, a FULL signal is asserted on a signal line 66, and the control logic 50 asserts the TRNSHLD-signal on the line 92 to temporarily suspend the processing of the CPU which initiated the write (and any further use of the system bus 16). Once a posted write is completed from a previous transaction (indicated to the central logic when the FULL signal becomes inactive), the control logic 50 deasserts the TRNSHLD- signal on the line 92, and the cycle on the system bus 16 continues and the write is posted as described above.

The present invention prevents interrupts for an extended duration. This interruption could disrupt system operation because some interrupts need to be processed within a certain amount of time; however, the present invention includes a provision for monitoring the duration that interrupts are disabled by the posted cycle counter. The control logic circuit 50 further monitors the time during which interrupts have been disabled by monitoring the CNT=0 signal via the signal line 78. The control logic includes the inhibit timer 52 which responds to the period of time the CNT=0 signal has been inactive. If the CNT=0 signal has been at a logic low level for longer than a system-dependent period of time, the control logic 50 disables posted writes to I/O addresses until the CNT=0 signal again becomes active (high) or for a pre-selected period of time. This feature prevents the inadvertent lockout of all interrupts by continuous or frequent write operations to the interrupt controller 80. The inhibit timer 52 may be enabled or disabled by software in order to provide more flexibility to the software designer.

Figure 3:
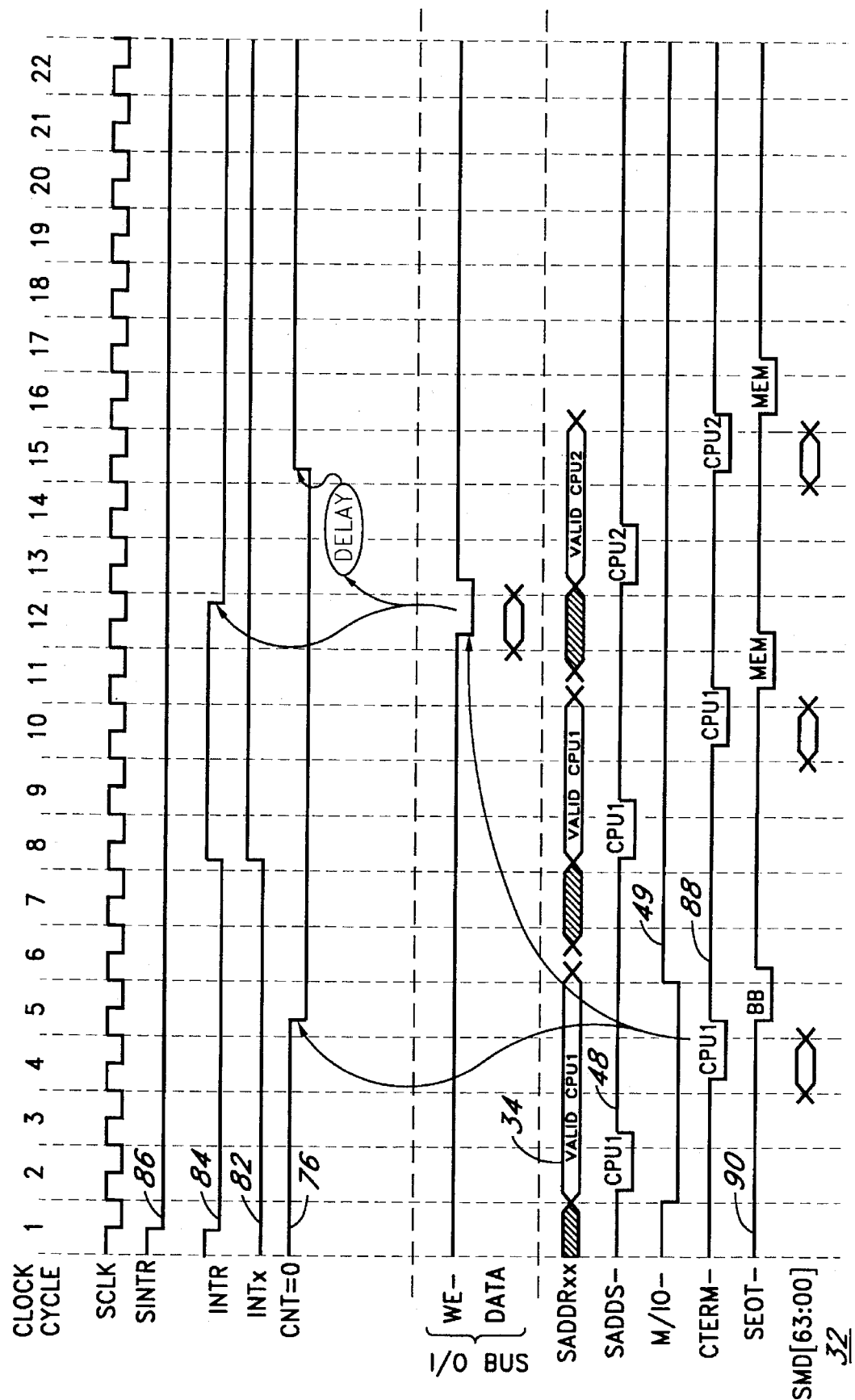
FIG. 3 is a timing diagram illustrating the input/output write cycle on a multi-processor system utilizing the bus architecture of the present invention.

FIG. 3 is a timing diagram that illustrates an I/O write cycle initiated by a CPU module on the multi-processor system 10. The first I/O write cycle begins in a clock cycle 1 with a first CPU (CPU 1) placing an address onto the SADDRxx lines 34 from the system bus 16 (FIG. 2). (For instance, the address could be for the interrupt controller 80; however, in the present embodiment, any I/O address will be detected by the disable circuitry.) The address becomes valid at the beginning of a clock cycle 2. After the CPU 1 has asserted the address, CPU 1 asserts the system address strobe on the SADDS- line 48 during the clock cycle 2 to signal a valid address. In the example of FIG. 3, the address remains valid from the clock cycle 2 through a clock cycle 5. The address decoder 44 decodes the address in response to the signal of the SADDS- signal line 48 and the M/IO- signal line 49. If the write operation is directed to I/O space, the outputs 54 and 58 of the address decoder 44 are asserted active.

At the beginning of a clock cycle 4, the data from the transfer initiated by the CPU 1 becomes valid on the databus 30 designated in the timing diagram as SMD [63:00]. This data remains valid for one clock cycle ending at the end of the clock cycle 4. Once the data is valid on the data bus 30, CPU 1 drives the CTERM- line 88 low during the clock cycle 4 to indicate the availability of the data. Upon receiving the CTERM- signal, the control logic 50 causes the buffers 32 to store the data and the address from the system bus 16. At the same time, the counter 56 is incremented by the active signal on the output 58 of the address decoder 44 to cause the CNT=0 signal to be asserted low (not true) during that clock cycle 5 (assuming the count was zero prior to the write cycle discussed here). While the CNT=0 signal is low, the SINTR signal to the system bus 16 on the line 86 is inhibited (i.e., it is held low because the input 76 to the gate 74 is low due to the low CNT=0 signal).

The bus bridge 22, via the control logic 50, acknowledges the receipt of the data on the SMD [63:00] data bus 30 during the clock cycle 4 by driving the system end of transaction (SEOT-) signal line 90 low. As seen in FIG. 3, this occurs during the clock cycle 5 after the bus bridge 22 has posted the address and data in the posted write buffer 32. The cycle terminate signal on the CTERM- line 88 returns high during the clock cycle 5, and the SEOT- strobe also returns high at a clock cycle 6. At this point, the CPU 1 has executed a write cycle which has been acknowledged by the bus bridge 22. As far as the CPU 1 is concerned, the device to which the data is directed, memory for instance, has acknowledged the request and the data has been received by the memory. The CPU 1 and all other microprocessors on the multiprocessor system bus 16 are free to execute additional write operations. This is true even though the data has not propagated to the final destination intended by the CPU 1.

As further seen in FIG. 3, the SINTR signal on the line 86 continues to be held low by the CNT=0 signal which is output by the posted cycle counter 56 on the signal line 76. The SINTR signal line 86 is held low until the I/O write propagates through the posted write buffers 32 and the CNT=0 signal again returns to an active state.

As explained above, the SINTR signal line 86 is held low in order to prevent an interrupt on the I/O subsystem bus 20 from propagating through to the system multiprocessor bus 16. Such an interrupt is signaled on the interrupt line 82 as represented by the action high portion of the INTx on the timing diagram of FIG. 3. The interrupt controller signal 80 simultaneously activates its INTR output on the line 84 to signal an interrupt to the system bus. However, because the SINTR line 86 is forced low by the inactive low CNT=0 signal on the signal line 76, the interrupt on the INTR signal line 84 is prevented from propagating through the AND gate 74. Accordingly, the interrupt is not passed to the system bus 16.

During a clock cycle 12, the data from the write operation and its associated address have propagated through the buffers 32, and the I/O bus 20 accepts the write operation from the bus bridge 16 by asserting the write enable 32. The address and data for the write operation are transferred from the buffers 32 onto the I/O bus 20. During the transfer, the address for the data is decoded by the second address decoder 68. The decoder 68 detects that the address is an I/O address and activates its output on the line 72 which provides the decrement input to the counter 56 during a clock cycle 13. The decrement of the posted cycle counter 56 actually does not occur for two clock cycles because the decrement is delayed by the timer 59. Accordingly, the decrement of the counter does not occur until a clock cycle 15. As depicted in FIG. 3, after the decrement, the CNT=0 signal on the line 76 from the counter 56 to the AND gate 74 is asserted active high. The activation of the CNT=0 signal enables an active INTR signal on the line 84 to pass through the AND gate 74 to activate an interrupt signal on the system multiprocessor bus 16. The purpose of the two clock cycle delay by the delay timer 59 is to assure that any I/O write operation directed to the I/O subsystem bus, which may effect the interrupt controller 80, has propagated to the intended destination. The timing sequence of FIG. 3 assumes that the I/O write operation contained a mask written by CPU 1 to the interrupt controller to mask the interrupt which was signaled on one of the INTx lines 82. Therefore, when the mask is received by the interrupt controller 80 when the posted write is finally processed at clock cycle 12 and 13, the INTR line 84 from the interrupt controller 80 is deasserted as depicted in the clock cycle 12 of FIG. 3. Because the INTR signal line 84 becomes low, the SINTR signal remains low during the clock cycle 15 because the interrupt mask has disabled the interrupt which was active.

As explained above, while the write is posted in the bridge 22, the system bus 16 can continue with other operations. For purposes of the present example, the CPU 1 initiates a memory cycle during clock cycles 8–11. As depicted in FIG. 3, the CPU 1 asserts the valid address during the clock cycle 8 and strobes the address strobe to indicate that the valid address is present. The CPU1 then places the valid data on the data bus SMD [63:00] during a clock cycle 10 and signals that valid data is present via the CTERM- signal line 88. The memory then receives the data and acknowledges the receipt and ends the transaction by asserting an active SEOT- signal on the line 90. During the clock cycle 13, a second CPU (CPU 2) initiates a similar memory cycle.

In sum, the present invention allows the system bus to continue to be utilized while posting all write operations in the bus bridge which are intended for the I/O subsystem and in order to allow posted rights to effectively inhibit interrupts during posted write transfers involving I/O addresses without requiring the originating processor to suspend operation and without requiring other processing to stop pending completion of the write cycle.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of increasing the bus bandwidth on a system bus in a computer system having a processor and a plurality of input/output (I/O) devices on an I/O bus, said system bus coupled to said I/O bus via a bus bridge such that said processor may communicate on said system bus independently of I/O activities on said I/O bus, said processor being able to communicate with said I/O devices on said I/O bus via said bus bridge, said computer system further comprising an interrupt controller having an output which propagates interrupts to said processor from said I/O devices, said method comprising the steps of:

posting a write operation from said processor directed to said I/O bus in said bus bridge;

inhibiting said output from said interrupt controller to preclude interrupts from propagating from said I/O bus to said system bus while said write operation is posted in said bus bridge;

transferring said posted write operation from said bus bridge to said I/O bus; and uninhibiting said output from said interrupt controller to allow said interrupts to propagate from said I/O bus to said system bus after said write operation is transferred from said bus bridge to said I/O bus.

2. The method of claim 1, further comprising the step of acknowledging that said write operation is complete by providing a signal to said system bus via said bus bridge when said write operation is initially posted, such that said system bus is free to handle further operations upon receipt of said signal.

3. The method of claim 1, wherein the step of inhibiting interrupts comprises inhibiting interrupts from propagating from said I/O bus when said write operation is directed to I/O address space.

4. The method of claim 1, wherein the step of inhibiting interrupts comprises inhibiting interrupts from propagating from said I/O bus when said write operation is directed to an interrupt controller for said I/O bus.

5. The method of claim 1, wherein the step of inhibiting interrupts comprises the steps of:

monitoring an address from said system bus corresponding to said write operation to detect when said address is an I/O address; and when said address is an I/O address, inhibiting interrupts from said I/O bus from propagating to said system bus.

6. The method of claim 1, wherein the step of inhibiting interrupts comprises the steps of:

monitoring an address from said system bus corresponding to said write operation to detect when said address is an I/O address affecting interrupts; and when said address is an I/O address affecting interrupts, inhibiting interrupts from said I/O bus from propagating to said system bus.

7. A system for increasing the bus bandwidth on a system bus which is coupled via a bus bridge to an input/output (I/O) bus, said system comprising:

posted write circuitry on said bus bridge, said posted write circuitry accepting write operations from said system bus directed to devices on said I/O bus and acknowledging said write operations to said system bus such that said system bus becomes free to continue with further operations;

an interrupt controller responsive to a plurality of interrupt inputs to selectively provide one of said plurality of interrupt inputs as an interrupt output to said system bus;

address detection logic on said bus bridge which monitors addresses associated with said write operations to determine if said addresses are for write operations which affect interrupts; and interrupt inhibit control circuitry responsive to said detection logic which, when an address is detected for a write operation which affects interrupts, inhibits said interrupt output from said interrupt controller from propagating to said system bus.

8. The system of claim 7, further comprising:

posted write detection logic coupled to said posted write circuitry, said posted write detection logic monitoring the number of write operations posted to said bus bridge to determine if said posted write circuitry is full; and write circuitry full logic which disables the bus bridge from accepting write operations if said posted write circuitry is full.

9. A method of increasing bus bandwidth for a system bus in a computer, the system bus coupled to an input/output (I/O) bus via a bus bridge, wherein the bus bridge posts at least one write operation from said system bus directed to devices on said I/O bus such that said system bus is free to continue operations after said write operation is posted on said bus bridge, said computer further including an interrupt controller which receives interrupts from devices on said I/O bus and which selectively propagates an interrupt output to said system bus, said method comprising the steps of:

monitoring an address on said system bus associated with said at least one write operation to detect if said address is an I/O address directed to said interrupt controller;

when said address is detected as an I/O address directed to said interrupt controller, inhibiting said interrupt output from said interrupt controller from propagating to said system bus until said write operation is transferred to said I/O bus;

transferring said write operation to said I/O bus; and enabling said interrupt output from said interrupt controller to propagate to said system bus after said write operation is transferred to said I/O bus.

10. The method of claim 9, wherein said bus bridge can post more than one write operation from said system bus, said method further comprising the steps of:

incrementing a counter on said bus bridge once for each write operation directed to said interrupt controller;

detecting when write operations directed to said interrupt controller are transferred to said I/O bus;

decrementing said counter when each write operation directed to said interrupt controller is transferred to said I/O bus; and inhibiting interrupts whenever said counter is non-zero.

11. A method for inhibiting interrupts in a computer, by monitoring addresses on a system bus to detect Input/Output references to an interrupt controller and inhibiting further interrupts while a posted write to an interrupt controller is pending, said method comprising the steps of:

writing data from said system bus to a first buffer;

writing addresses for Input/Output references from said system bus to a second buffer;

decoding said addresses to determine whether at least one of said Input/Output references is directed to said interrupt controller;

incrementing a counter when said at least one of said Input/Output references is directed to an interrupt controller;

deasserting an interrupt enable signal to an interrupt gating circuit to inhibit interrupts while said counter has a non-zero value;

providing the output of said interrupt controller as a second input to said interrupt gating circuit; and providing the output of said interrupt gating circuit to said system bus as an interrupt signal, said output of said interrupt controller inhibited from being gated through said interrupt gating circuit while said interrupt enable signal is deasserted.

12. The method of claim 11, further including the steps of:

monitoring the output of said buffers by a second address decoder to detect the completion of an Input/Output reference to an interrupt controller;

decrementing the count of said counter when an Input/Output reference to said interrupt controller is completed; and reasserting the interrupt enable signal from the counter to said interrupt gating circuit whenever said counter is decremented to zero, thereby enabling the interrupt signal to be output from said interrupt gating circuit.

13. The method of claim 11, further including the steps of:

monitoring the duration of time for which interrupts have been disabled; and automatically reenabling interrupts after a predetermined time duration to prevent a condition whereby said system may never receive an interrupt.

14. A method of inhibiting interrupts in a computer having a system bus and an Input/Output bus and having an interrupt controller on said Input/Output bus, comprising the steps of:

monitoring addresses on a system bus to detect Input/Output references to said interrupt controller;

incrementing a counter value when each Input/Output reference to said interrupt controller is initiated;

decrementing a counter value when each Input/Output reference to an interrupt controller is completed; and inhibiting interrupts generated by said interrupt controller while said counter value is non-zero.

* * * * *